(12) United States Patent
Gibson

(10) Patent No.: US 8,235,400 B2
(45) Date of Patent: Aug. 7, 2012

(54) MULTI-USE CHILD SEATING APPARATUS

(76) Inventor: Shaun Gibson, Westfield, MA (US)

( * ) Notice: Subject to any disclaimer, the term of this patent is extended or adjusted under 35 U.S.C. 154(b) by 496 days.

(21) Appl. No.: 12/500,885

(22) Filed: Jul. 10, 2009

(65) Prior Publication Data

US 2010/0007106 A1  Jan. 14, 2010

Related U.S. Application Data

(60) Provisional application No. 61/079,552, filed on Jul. 10, 2008.

(51) Int. Cl.
*B62D 39/00* (2006.01)
*A47D 1/10* (2006.01)
*B62B 7/00* (2006.01)

(52) U.S. Cl. .......... 280/33.993; 297/256.17; 280/87.051

(58) Field of Classification Search ............... 280/648, 280/30, 87.051, 47.38, 33.993; 297/256.16, 297/256.17
See application file for complete search history.

(56) References Cited

U.S. PATENT DOCUMENTS

| | | | | |
|---|---|---|---|---|
| 2,665,742 | A * | 1/1954 | Starysky | 280/7.1 |
| 2,889,151 | A * | 6/1959 | Sides | 280/33.993 |
| 3,052,500 | A * | 9/1962 | Hyde | 297/174 CS |
| 3,351,380 | A | 11/1967 | Sprague | |
| 3,353,836 | A | 11/1967 | Davis | |
| 4,156,318 | A | 5/1979 | Economy | |
| 4,204,695 | A | 5/1980 | Salzman | |
| 4,586,721 | A * | 5/1986 | Harada et al. | 280/30 |
| 4,598,945 | A * | 7/1986 | Hopkins | 297/256.17 |
| 4,674,758 | A | 6/1987 | Valley et al. | |
| 4,861,105 | A * | 8/1989 | Merten et al. | 297/256.17 |
| 4,958,887 | A * | 9/1990 | Meeker | 297/256.17 |
| 4,971,343 | A | 11/1990 | Wood | |
| 5,056,865 | A * | 10/1991 | Sedlack | 297/256.17 |
| 5,096,260 | A | 3/1992 | Hagerstrom | |
| 5,277,473 | A | 1/1994 | Kelly et al. | |
| 5,312,122 | A | 5/1994 | Doty | |
| 5,348,323 | A | 9/1994 | Trubiano | |
| 5,480,211 | A | 1/1996 | Douglas et al. | |
| 5,611,597 | A | 3/1997 | Lanz | |
| 5,702,114 | A * | 12/1997 | Downing et al. | 280/47.23 |
| 5,813,720 | A * | 9/1998 | Huang | 297/5 |
| 5,848,797 | A | 12/1998 | Paez | |
| 6,224,152 | B1 | 5/2001 | Hughes et al. | |
| 6,231,056 | B1 * | 5/2001 | Wu | 280/7.17 |
| 6,390,552 | B1 | 5/2002 | Veron | |
| 6,453,588 | B1 | 9/2002 | Lykens | |
| 6,464,238 | B2 | 10/2002 | Reiland et al. | |
| 6,575,480 | B2 | 6/2003 | McKelvey | |
| 6,863,287 | B2 | 3/2005 | Myers et al. | |
| 7,325,871 | B2 * | 2/2008 | Gangadharan et al. | 297/256.16 |
| 7,347,432 | B2 * | 3/2008 | Myers et al. | 280/87.051 |
| 7,497,461 | B2 | 3/2009 | Emerson | |
| 7,507,162 | B2 * | 3/2009 | Jackson et al. | 472/14 |
| 2008/0203780 | A1 * | 8/2008 | Anselmi et al. | 297/174 CS |

FOREIGN PATENT DOCUMENTS

DE  3931549 A1 * 4/1991
GB  2366514 A  * 3/2002

* cited by examiner

*Primary Examiner* — J. Allen Shriver, II
*Assistant Examiner* — Bridget Avery
(74) *Attorney, Agent, or Firm* — Dale J. Ream

(57) ABSTRACT

A multi-use child seating apparatus is provided for attachment to a number of frame structures, including a shopping cart, a table, a walker unit, a child activity center, and the like. A seating unit includes a seating frame and a flexible seat for receiving a child in a seated position therein. A mounting mechanism attached to the seating frame is adapted for mounting the seating apparatus to a frame structure, such as the handlebar of a shopping cart, and at least one connector is provided to secure the seating apparatus to the frame structure and brace the seating unit from movement when a child is seated in the flexible seat. A plurality of legs may be movably connected to the seating frame and moved to a deployed position to engage a frame structure, such as a table, to further secure the seating apparatus to the frame structure.

16 Claims, 10 Drawing Sheets

MULTI-USE CHILD SEATING APPARATUS

CROSS-REFERENCE TO RELATED APPLICATIONS

The present application is a continuation of and claims priority to U.S. Provisional Patent Application Ser. No. 61/079,552, filed Jul. 10, 2008, herein incorporated by reference in its entirety.

FIELD OF THE INVENTION

The present invention relates to multi-use child products and, more particularly, to multi-use child seats that may be interchangeably attached to mobile supports, including walkers, exersaucers and child activity centers, or fixed supports, including shopping carts and tables.

BACKGROUND OF THE INVENTION

Multi-use child products are highly desirable to parents of young children. There are great advantages to having a single device capable of performing multiple functions, including benefits derived from the versatility and adaptability of a single product to various uses; increased space saving capacity; and cost savings from not needing to buy multiple products. One such product well suited for multi-use capabilities is a child seating apparatus. Children are highly dependent on the parent during the infant stage when they cannot walk or are just beginning to learn to walk. One option available for the parent is to hold and carry the child everywhere, which can be tiring and tie up the parent's hands making it difficult for the parent to do anything else, including keeping track of another child. Another option is to put the child in a stroller, which can be bulky and difficult to maneuver in certain situations, such as in a restaurant. Either option is much more difficult to deal with when handling multiple children at once. Therefore, there is a particular need for a multi-use child seating apparatus that is adaptable to multiple uses, easy to use, portable, and doesn't tie up the parents hands or attention.

Certain prior art child seating apparatus are capable of multiple uses. For example, many child car seats can be used in a car and also removed for attachment to a stroller. However, many existing multi-use child seats are still limited in use, and there are many everyday uses for such a child seating apparatus for which no reasonable solution has heretofore existed. Accordingly, a desirable child seating apparatus should be adaptable for use in a variety of activities so as to improve the versatility of the apparatus through the course of a typical day, including uses both at home and out and about. For example, a seating apparatus is needed for activities such as trips to the grocery store and sitting at a picnic table, with the versatility to be used at home as a walker or with a child activity center. In particular, none of the prior art devices provide a suitable multi-use child seat that can be used when shopping, at the park or at a restaurant, especially when trying to keep track of multiple children.

Current devices adapted to carrying small children during shopping trips include shopping carts which are often provided in grocery stores and other stores where the purchase of a large number of goods is likely. Standard shopping carts typically include a main body, which comprises a basket portion for placing the goods to be purchased, a seat portion, and a handlebar for pushing the shopping cart. The seat portion typically includes a backrest and a seat. When the child is placed into the seat portion, the child's legs are inserted through leg holes provided in the main body of the shopping cart so that the seated child is facing the parent pushing the cart.

This method of carrying children is disadvantageous for several reasons. For example, most shopping carts are adapted to carry only one child. Parents with two or more children find it difficult to use existing shopping carts, unless two adults are present and can use two or more shopping carts. Although some retail outfits provide carts having more than one seat portion, these carts are typically limited in number and are often difficult to maneuver due to their excess length or width. Parents with two or more children often place an older child into the basket portion of the shopping cart; however, this is dangerous for the child and limits the space available for placing goods to be purchased. Moreover, existing seats built into the shopping cart are only useful for children having sufficient neck control. Young infants may not be placed into the shopping cart seats because they may tip in any direction, potentially causing injury to the neck.

Other devices commonly used for carrying small children during shopping trips include infant car seats. Infant car seats include a base portion, which is fixed in the automobile, and a carrier portion, which is removably fixed to the base portion during car trips. Parents commonly detach the carrier portion from the base portion of the infant car seat and rest the carrier portion on and between the handlebar and the backrest of the seat portion of the shopping cart. This method of carrying children during shopping trips is disadvantageous for several reasons. First, the carrier portion of an infant car seat does not include means for securely attaching the infant car seat to a shopping cart. As a result, placement of the carrier portion atop of a shopping cart is dangerous because it is not possible to achieve a secure fit and the seat can shift while the shopping cart is moved. Thus, the possibility of injury to the child is high. Moreover, placement of the infant seat's carrier portion atop of a shopping cart fully obstructs the seat portion of the shopping cart. Accordingly, the existing seat portion of the shopping cart is rendered useless and thus does not resolve the issues presented to a parent with more than one child.

Parents having an infant and at least one other child commonly place the infant seat's carrier portion inside the basket portion of the shopping cart. The older child may then be placed in the seat portion of the shopping cart. This method of carrying children is also disadvantageous for several reasons. For example, the parent's view of the infant is obstructed by the older child, which may present safety hazards. Additionally, the amount of space available in the basket portion of the shopping cart is significantly restricted or rendered useless, depending on the size of the shopping cart.

Existing seating methods for shopping carts are generally fairly limited for other uses, and most are specifically designed for shopping cart usage. A car seat can be used in the car, as intended, and removed for use in a stroller and perhaps perched on top of a shopping cart, but there is little additional versatility beyond those uses. Other devices may exist for attachment to a table, but typically such devices cannot be likewise used with a shopping cart without any of the drawbacks discussed above. Most such seating devices do not have suitable versatility to be used both at home and out and about.

Therefore, there exists a need in the industry for a child seating apparatus adaptable to multiple applications, including for shopping carts, picnic tables, and walkers, that is inexpensive, lightweight, portable and easy to use, whereby parents may bring more than one small child on a shopping trip, whereby the child seat may be securely fixed to the shopping cart, whereby the child seat does not obscure the parent's view of any child, whereby the child seat does not compromise the space available to place goods in the basket portion of a shopping cart, whereby a parent may watch multiple children at the park or in a restaurant, whereby a parent may use the apparatus at home, and whereby the parent may use the apparatus for other activities.

SUMMARY OF THE INVENTION

According to a first aspect of the present invention, a multi-use child seating apparatus is adapted for attachment to a frame structure, including at least one of a shopping cart, a table, a walker unit, and a mobile child activity center. The child seating apparatus comprises a seating unit that includes a seating frame and a flexible seat for receiving a child in a seated position therein. The flexible seat is removably attached to the seating frame. A mounting mechanism is attached to the seating frame and adapted for mounting the child seating apparatus to the frame structure. At least one connector is anchored to one of the seating frame and the mounting mechanism, and adapted for engagement with the frame structure for securing the seating apparatus to the frame structure and for bracing the child seating apparatus from movement when a child is seated in the flexible seat.

The mounting mechanism of the present invention may comprise a U-shaped channel adapted to receive a portion of the frame structure therein. Gripping means, including an adhesive material, resilient foam padding, rubber nipples, or the like, may be disposed on the interior surface of the channel for engaging a portion of the frame structure to secure the attachment of the child seating apparatus to the frame structure. The connector may comprises a fastener, such as a hook, clasp, bracket or the like, attached to an adjustable strap, where the fastener engages the frame structure.

In another aspect of the present invention, a plurality of legs may be movably connected to the seating frame of a child seating apparatus. Each leg is movable between a stored position and a deployed position. When the legs are in the deployed position, a portion of each of the legs is positioned away from the seating frame to engage the frame structure to support attachment of the child seating apparatus to the frame structure. Such legs are especially useful when the frame structure is a table. The legs may be pivotally attached to the seating frame, extensible slidable with respect to the seating frame, telescoping, or the like.

According to another aspect of the present invention, a child seating apparatus is combined with a walker unit comprising a U-shaped base and a frame. The seating unit is removably mounted to the walker unit and comprises a seating unit that includes a seating frame, a flexible seat for receiving a child in a seated position therein, and at least one fastener for attaching the seating unit to the walker unit. A child can be supported in an upright seated position when placed within the flexible seat. Alternatively, the chills may operate the walker unit by holding onto the seating unit when standing behind the combined walker and multi-use child seating apparatus.

According to yet another aspect of the present invention, a multi-use child seating apparatus for shopping carts includes a seating frame, a flexible seat, a mounting mechanism for mounting the seating apparatus to a handlebar of the shopping cart, and at least one connector for securing the child seating apparatus to the shopping cart. When attached, the child seating apparatus permits two children to safely be seated in the shopping cart, with one child sitting in the existing seat portion of the shopping cart facing the parent, and a second child sitting in the child seating apparatus closest to the parent without interfering with the parent's line of sight or with operation of the shopping cart.

The multi-use child seating apparatus of the present invention is a low-cost, lightweight and user-friendly solution to the problems associated with existing devices and methods for holding, watching, or carrying more than one child during shopping trips, at a restaurant, or in the house. It is also easily transported and can be adapted to fit any shopping cart or tabletop. It is further capable of attachment to a walker unit, exersaucer, or child activity center.

These and other features, objects, and advantages of the present invention are described with reference to the drawings of preferred embodiments and various features of a multi-use child seating apparatus. The illustrated embodiments of the multi-use child seating apparatus of the present invention are intended to illustrate, but not limit, the invention.

BRIEF DESCRIPTION OF THE DRAWINGS

FIG. 15 is a diagrammatic bottom plan view of another embodiment of a multi-use child seating apparatus in accordance with the present invention, and having pivoting legs for mounting the apparatus to shopping carts, tables, walker units and the like;

FIG. 17 is a sectional side view of another embodiment of a multi-use child seating apparatus in accordance with the present invention and having extensible and retractable legs for mounting to shopping carts, tables, walker units and the like.

DETAILED DESCRIPTION OF PREFERRED EMBODIMENTS OF THE INVENTION

Figure 8:
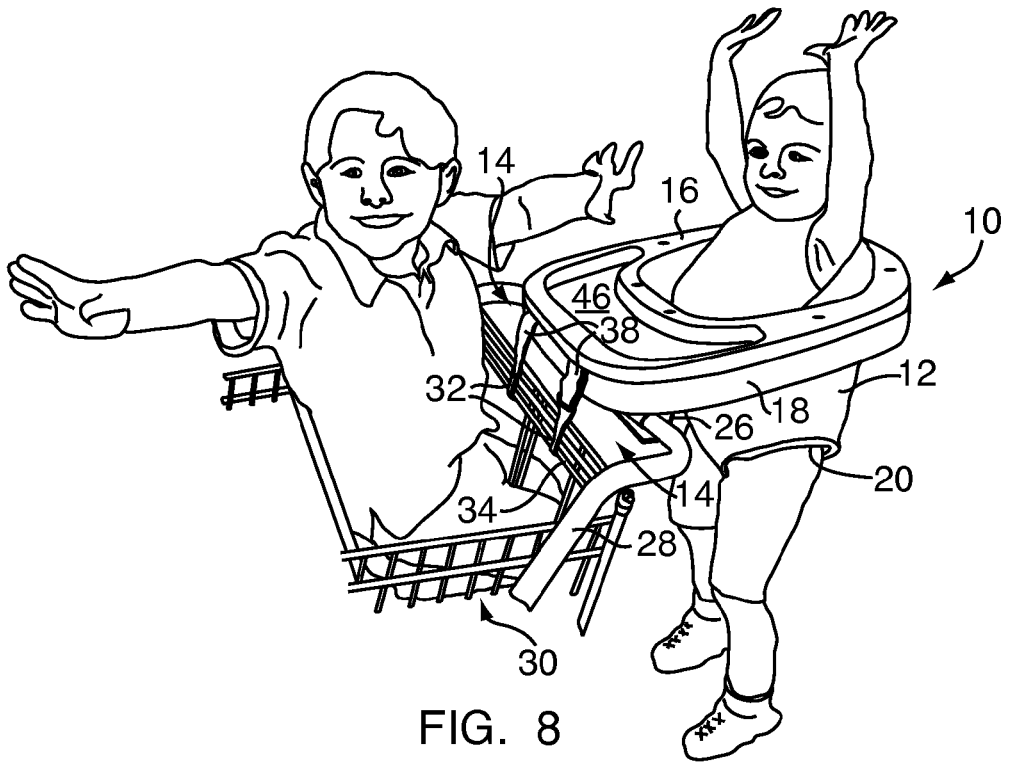
FIG. 8 is a perspective view of the multi-use child seating apparatus of FIG. 1, in use and supporting a child on a shopping cart.
Figure 9:
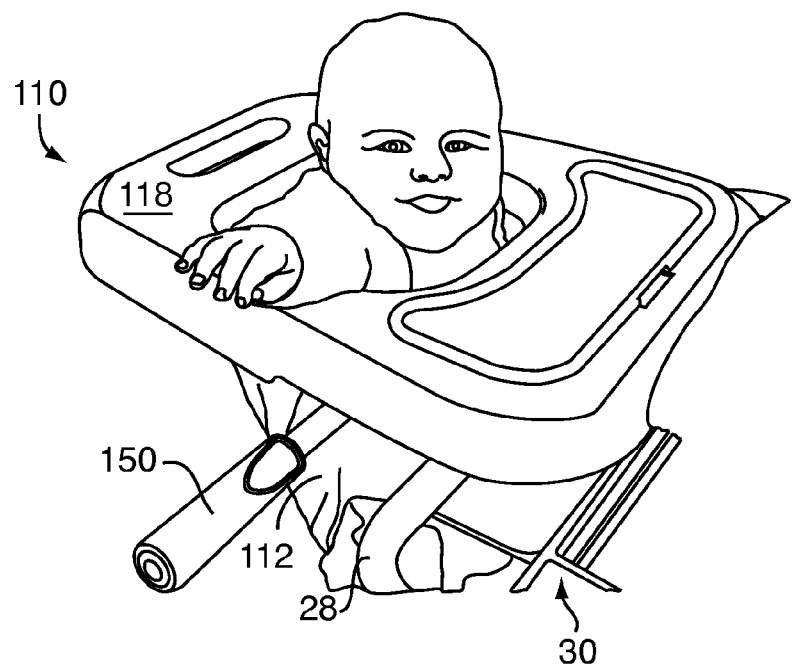
FIG. 9 is a perspective view of an alternative embodiment of a multi-use child seating apparatus in accordance with the present invention.

Referring to FIGS. 1-8, a multi-use child seating apparatus 10 in accordance with the present invention is shown. The child seating apparatus 10 is especially suitable for cantilevered mounting to a shopping cart, but is also adaptable to be mounted to a table top, a walker unit, an exercising device, a child activity center, and similar frame structures whereby a small child can be easily seated and watched by a parent. The child seating apparatus 10 is a portable unit, and includes a seat 12, a support structure 16, and a body portion 18. A mounting mechanism 14 is attached to the support structure 16 for mounting the child seating apparatus 10 to a frame or device, such as a shopping cart. As is known, a common shopping cart design typically includes a basket portion for placing the goods to be purchased, a seat portion including a backrest and a seat, and a handlebar for pushing the shopping cart. The attachment is adapted to be mounted on the handlebar without interfering with a child seated in the seat portion of the cart, as shown in FIG. 8, which gives the child seating apparatus 10 added versatility above and beyond any prior art device for seating kids on shopping carts.

Figure 10:
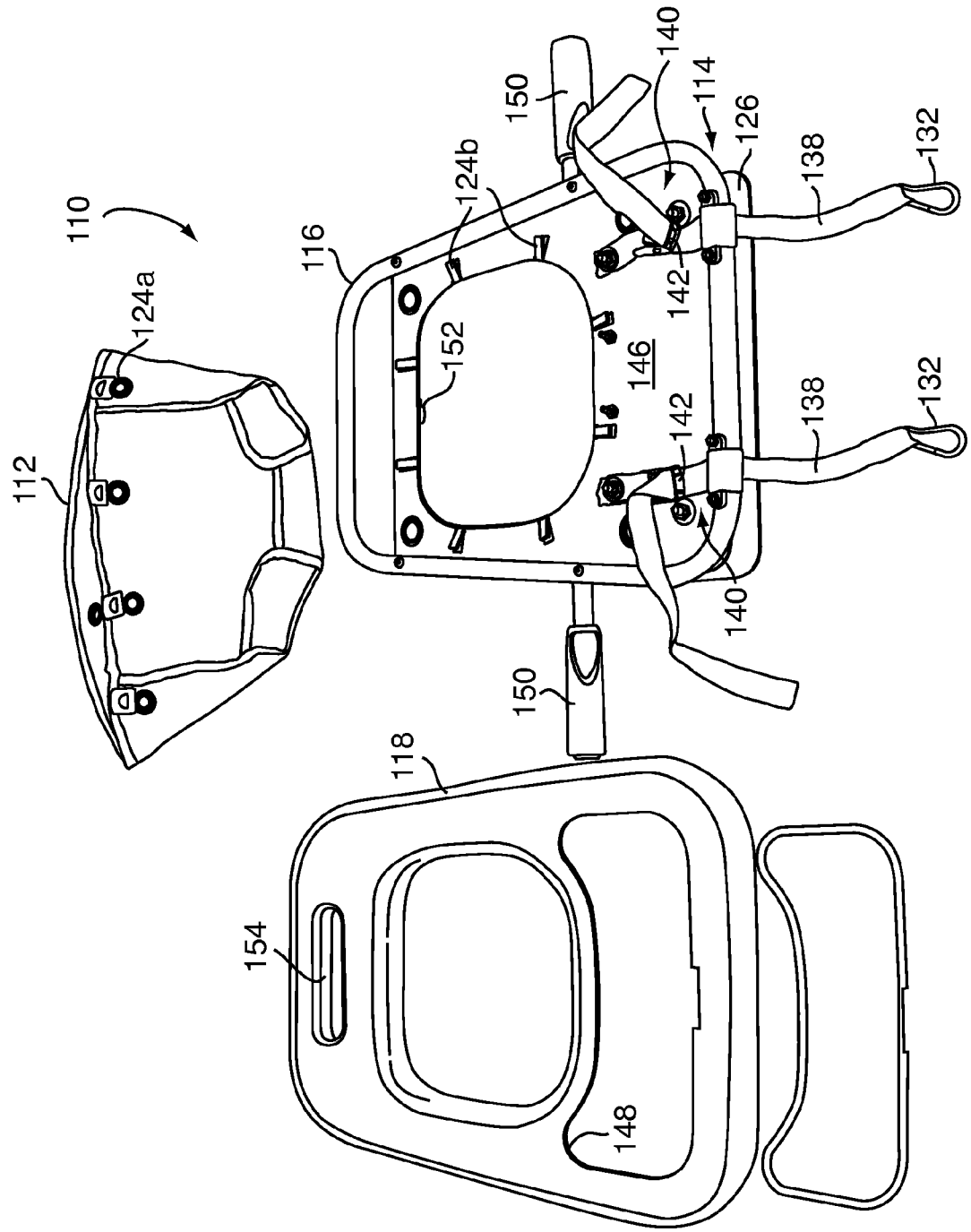
FIG. 10 is an exploded top view of the multi-use child seating apparatus of FIG. 9.
Figure 11:
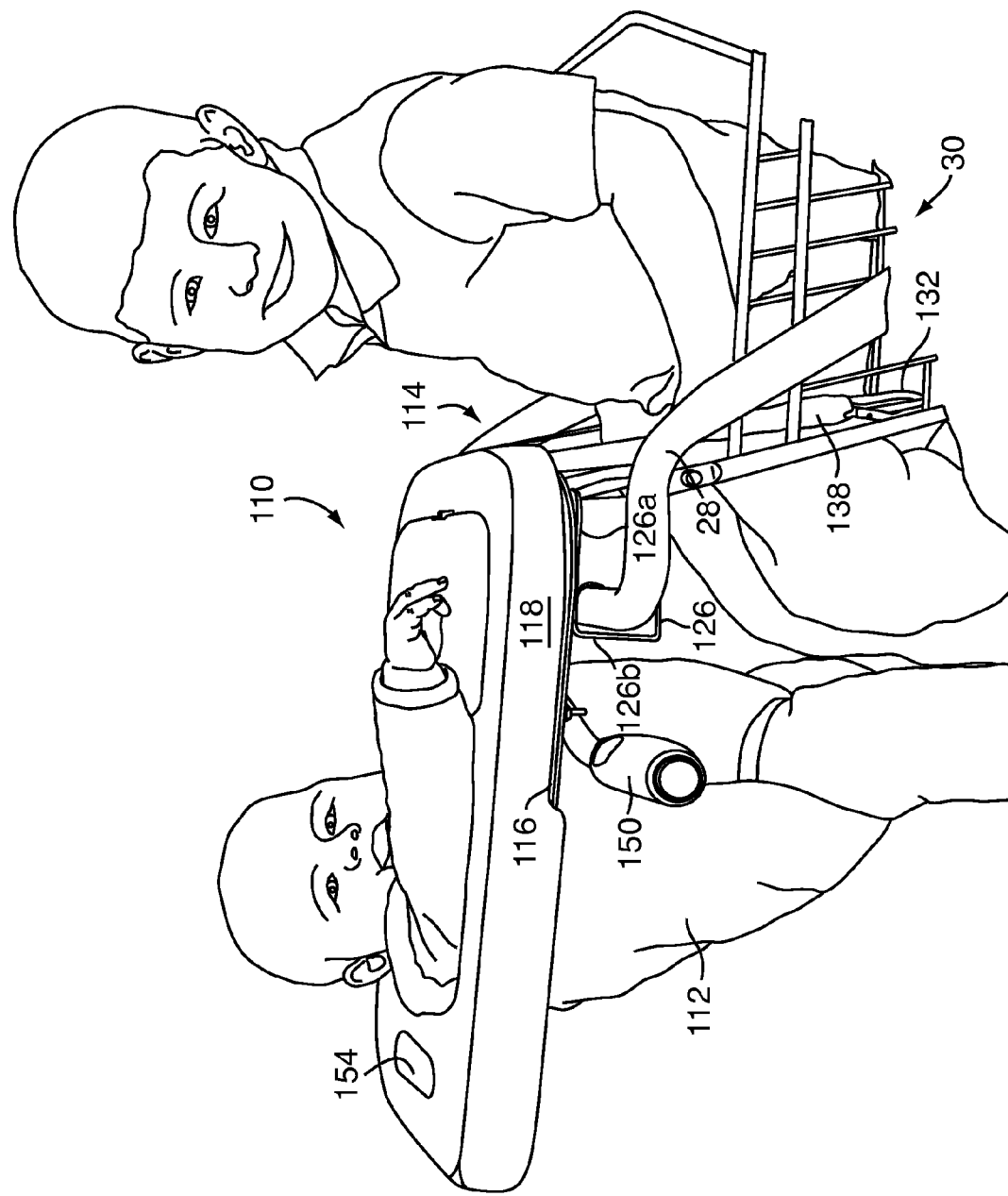
FIG. 11 is a side view of the multi-use child seating apparatus of FIG. 9.

The seat 12 is a flexible, bucket-style seat hanging down from the support structure 16, and includes leg holes 20 and a back 22. The seat is preferably removably attached to the support structure 16 for easy removal and reattachment. Preferably, the seat 12 is fabricated from washable fabric for easy cleaning and is padded for the child's comfort. As may be appreciated, the seat 12 may be fabricated of any suitable material and may include other features, such as a headrest formed integral with the back 22, footrests extending from the leg holes 20, or other padded features for supporting a child in a seated position. Preferably, the seat 12 is attached to the support structure 16 by fastening means 24. In the embodiment shown in FIG. 2, screws are provided as the fastening means 24 for a more secure attachment of the seat 12 to the support structure. However, it may be desirable to provide fastening means 24 that allow for easy removal of the seat 12 from the support structure 16 so that the seat 12 may be washed. Accordingly, the fastening means 24 may be snaps, hooks, clips, straps, Velcro® fasteners, or any other known means of attachment whereby the seat 12 may be easily separated from and reattached to the support structure 16. FIG. 10, discussed in more detail below, uses grommets and tangs to removably attach the seat to the support structure while ensuring a secure attachment for when a child is seated in the seating apparatus.

Figure 4:
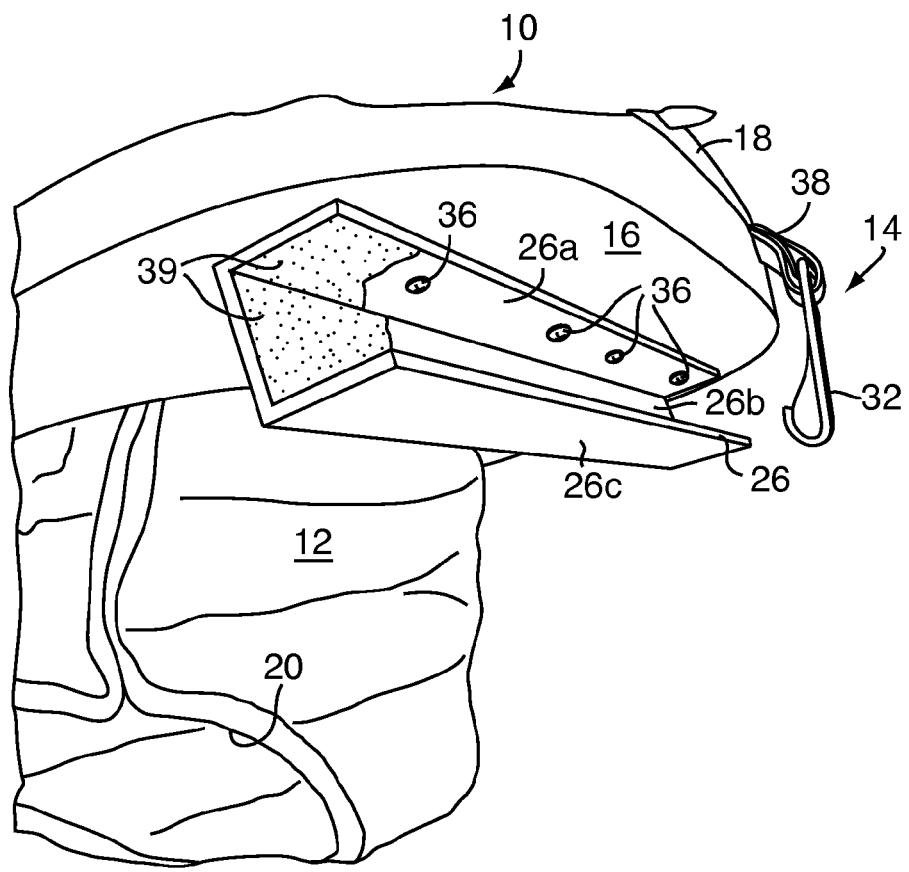
FIG. 4 is a side perspective view of a mounting mechanism for the multi-use child seating apparatus of FIG. 1.
Figure 5:
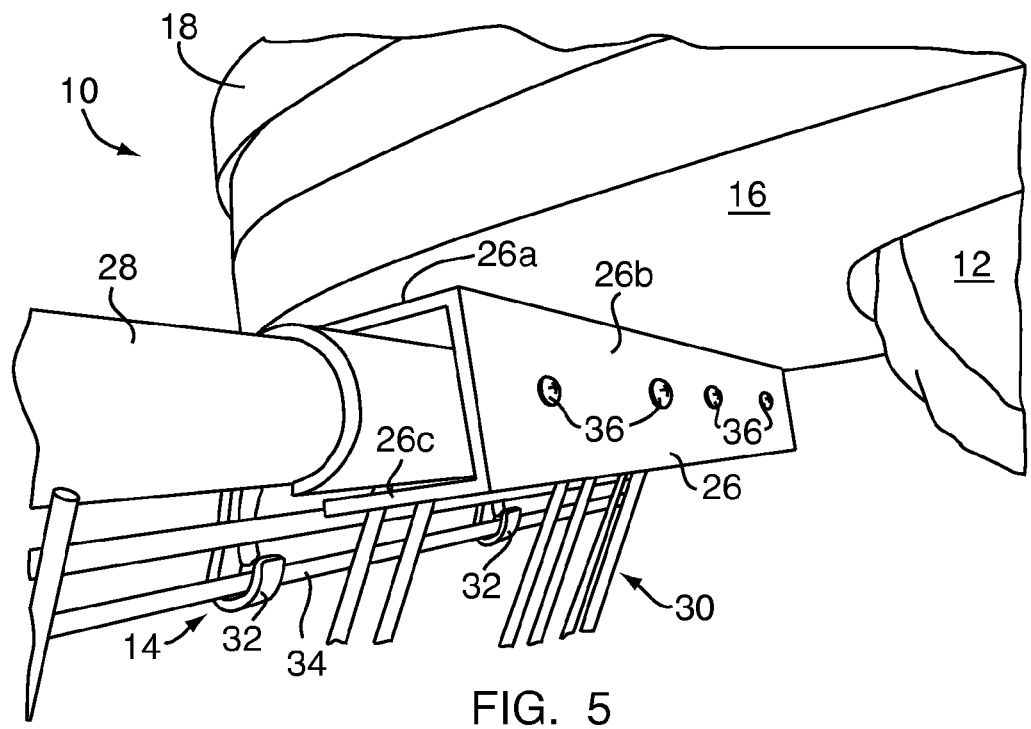
FIG. 5 is a rear perspective view of the mounting mechanism of FIG. 4.
Figure 6:
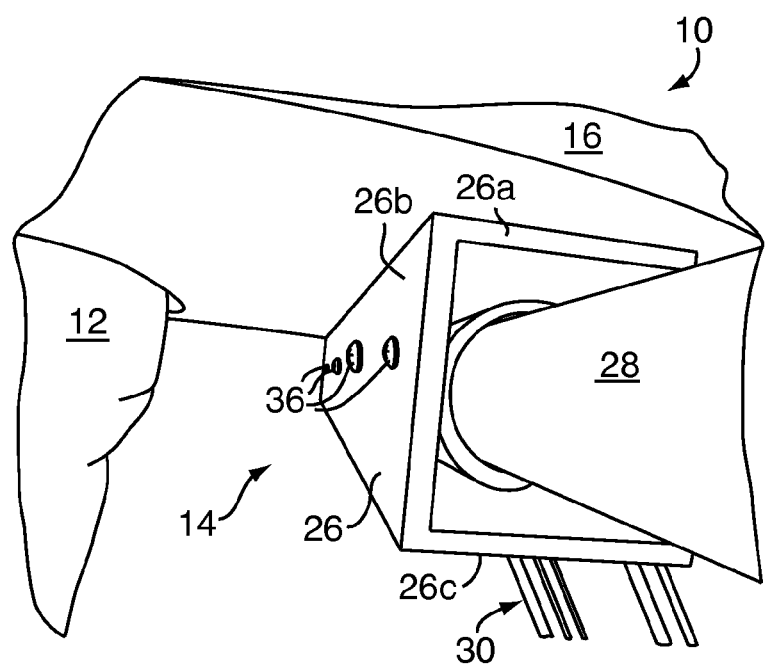
FIG. 6 is a side view of the mounting mechanism of FIG. 4.
Figure 7:
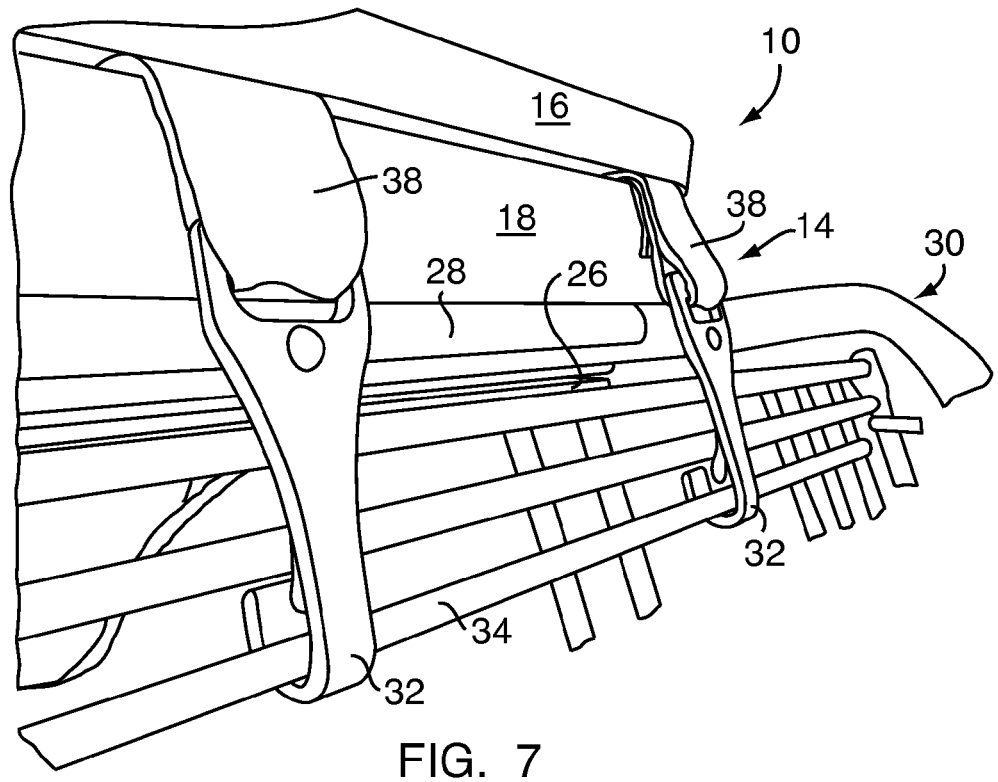
FIG. 7 is a side perspective view of an attachment mechanism for the multi-use child seating apparatus of FIG. 1.

Referring to FIGS. 4-6, the mounting mechanism 14 includes a U-shaped channel 26 that is adapted to engage and at least partially enclose a handlebar 28 of a shopping cart 30, the edge of a table (see FIGS. 16, 18), or a frame member of a walker unit or similar frame structure. To mount the child seating apparatus 10 to the shopping cart 30, the channel 26 is placed over the handlebar 28 so that the child seating apparatus is cantilevered off of the back of the shopping cart 30 without interfering with the seat portion or the basket portion of the shopping cart 30. Hooks 32 or other connectors are provided to engage the frame of the shopping cart 30, for example, horizontal bar 34, and brace any downward force applied to the child seating apparatus 10 once the child is place in the seat 12.

As illustrated, the channel 26 has three sides, 26a, 26b, and 26c and is rigidly fastened to the bottom side of the support structure 16 by way of screws 36. Alternatively, the channel 26 can be formed integrally with the support structure 16, or can be fastened to the support structure 16 by any other means for attachment including exemplary means for attachment such as welding, bolting, bonding, clamping, riveting, or the like.

Other embodiments of the mounting mechanism 14 may include gripping means 39 placed along the interior surface of at least one side of the channel 26 to improve the grip between the child seating apparatus 10 and the handlebar 28. The gripping means 39 engage the handlebar 28 to secure the attachment of the child seating apparatus 10 to the shopping cart 30 and thus further restrain rotation of the channel 26 around the handlebar 28. The gripping means 39 could be provided in the form of a replaceable adhesion strip that can be attached to the channel 26 before each use, and removed after use. Alternatively or additionally, the gripping means 39 could be provided as, for example, resilient foam padding or rubber nipples disposed on one or more inner surfaces of the channel parts 26a, 26b, 26c to ensure a tight fit between the channel 26 and the handlebar 28. These alternative or additional gripping means would further provide self-adjustment so that the child seat attachment 10 could easily be securely mounted to shopping cart handlebars of varying shapes and sizes.

The hooks 32 are anchored or tethered to the support structure 16 by way of straps 38. Alternatively, the hooks 32 can be anchored or tethered directly to the mounting mechanism 14. The hooks 32 provide a means for restraining rotation of the channel 26 around the handlebar 28, so that the child seat attachment 10 will not slip off the shopping cart 30. Preferably, the straps 38 for the hooks 32 are adjustable to accommodate changing size and weight of the child, as well as different shopping cart designs. As may be appreciated, alternative connectors for bracing the child seating apparatus 10 may include ties, bungee cords, straps with clasps, brackets or any other known equivalent to the hooks for attaching and securing the child seating apparatus 10 to the shopping cart 30 or other structures.

The child seating apparatus 10 of the present invention is also capable of being attached to a table or similar frame structure, for example, by securing the mounting mechanism 14 in position by sliding the channel 26 over the edge of the table or a frame member, and further bracing the apparatus 10 by hooks 32 or similar connectors. The gripping means 39 discussed above can also be used to grip and interact with a portion of the table to secure the attachment of the child seating apparatus to the table and brace the apparatus from moving or slipping when a child is seated therein.

Figure 1:
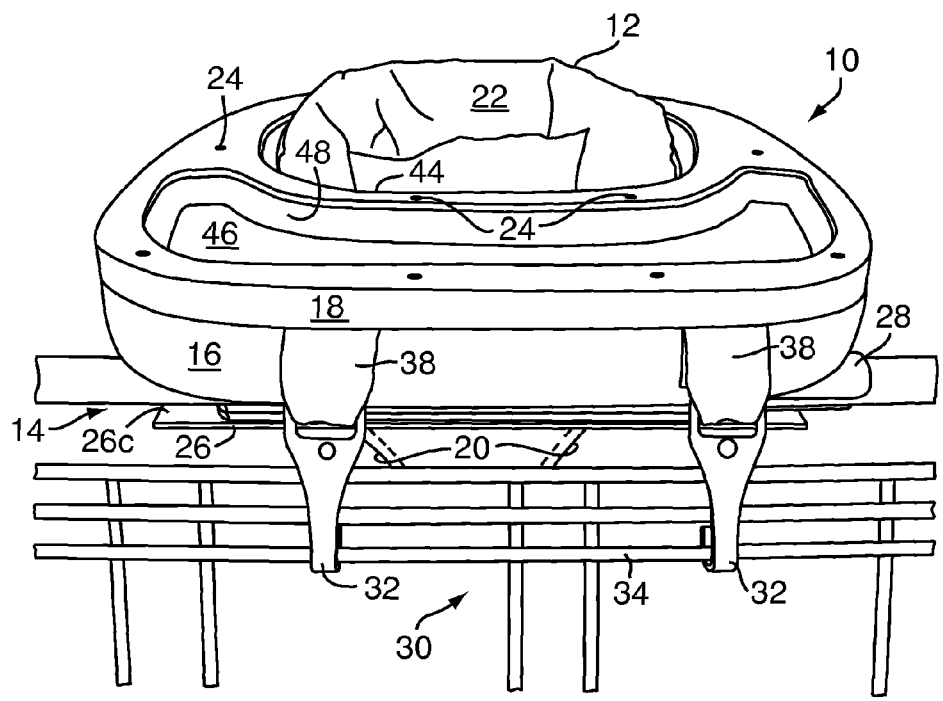
FIG. 1 is a front perspective view of one embodiment of a multi-use child seating apparatus for shopping carts, tables and the like, according to an embodiment of the present invention.
Figure 2:
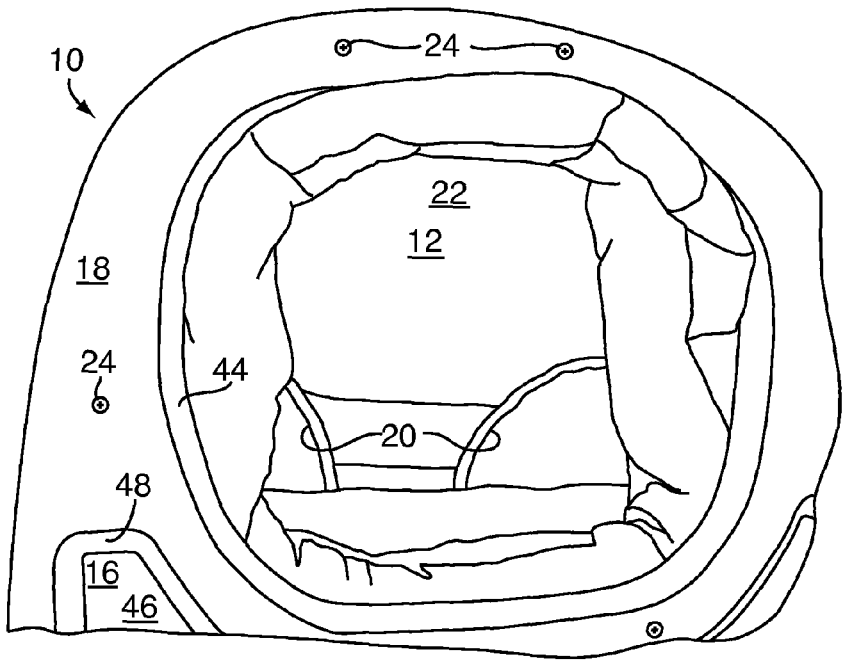
FIG. 2 is a top view of the multi-use child seating apparatus of FIG. 1.
Figure 3:
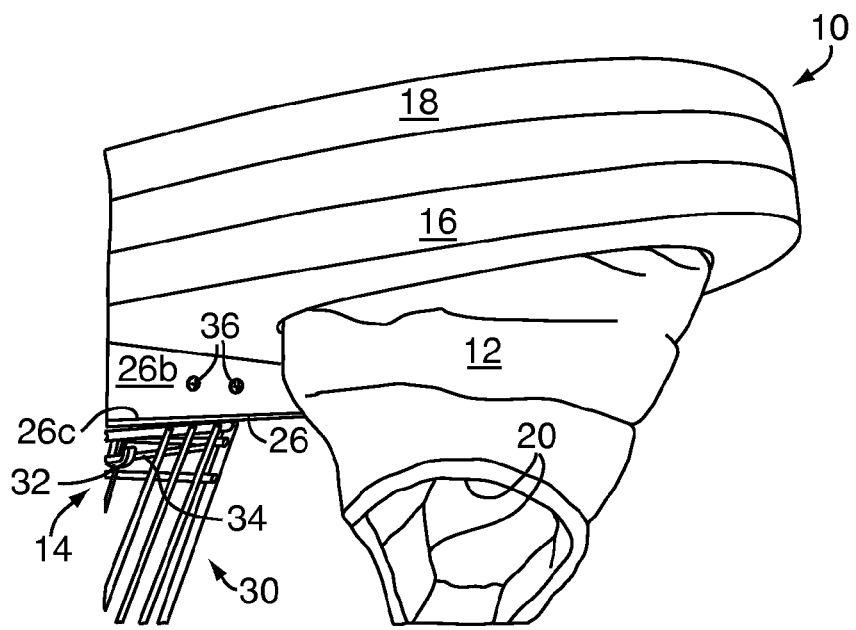
FIG. 3 is a side view of the multi-use child seating apparatus of FIG. 1.

The support structure 16 includes an opening 44 for receiving the seat 12, and preferably surrounds the torso of a child seated within the seat 12. The support structure generally provides stability for the child seating apparatus 10 when it is cantilevered off of a frame structure such as a shopping cart, a table, or the like. The body 18 is attached to the support structure 16. Preferably, the body 18 is easily removable from the support structure 16 for cleaning. The body 18 can be shaped to include a tray 46, for example as shown in FIGS. 1-2, on which the child can place a snack or toy, or merely grab onto when the shopping cart is moving. The tray 46 may be covered by a snap in cover (not shown) and made accessible by removing the cover from a cutout 48 formed in the body 18. Additionally, the body can be shaped to include other features, including a bottle holder, holes or projections for clipping a toy, and handles for grabbing.

As may be appreciated, the body 18 and the support structure 16 may be integrally formed as opposed to formed as separate pieces as shown herein. An advantage of separate pieces is that the body 18 can be removed from the support structure 16 for cleaning or for covering the attachment of the seat 12 to the support structure 16 so a child cannot accidentally disengage the seat 12 from the support structure 16. The body 18 and the support structure 16 may be fabricated from wood, plastic, or any other material having rigidity, durability, high weight-bearing capacity, relatively low density, and easy-cleaning surface properties. Preferably, the body 18 is injection-molded plastic, and the support structure 16 is lightweight aluminum. In general, the child seating apparatus 10 is lightweight to provide portability without affecting the strength and rigidity of the apparatus.

In operation of the child seating apparatus 10 with a shopping cart 30, a parent grasps the child seat attachment 10 and slides the mounting mechanism 14 onto the handlebar 28 of the shopping cart 30 so that the channel 26 encompasses the handlebar 28. The mounting mechanism 14 should be adjusted so that the support structure 16 is substantially horizontal and the mounting mechanism 14 at least partially encloses and grips the handlebar 28 of the shopping cart 30. Once a desirable position of the child seating apparatus 10 has been achieved, the parent attaches the hooks 32 to the bars 34 of the shopping cart 30 and adjusts the straps to ensure a tight attachment. Once the child seating apparatus 10 is secure, the parent may place a larger or heavier child into the seat portion of the shopping cart 30. The parent may then place the smaller, lighter child into the seat 12, as shown in FIG. 8.

In operation of the child seating apparatus 10 with a tabletop, the parent takes a similar approach as with the shopping cart. Specifically, the parent slides the mounting mechanism 14 onto the edge of the tabletop so that the channel 26 encompasses the tabletop. The mounting mechanism should be adjusted so that the support structure is substantially horizontal. Once the desired position of the child seating apparatus 10 has been achieved, the parent can attach the hooks 32 or similar connectors to the table and adjust the straps to ensure a tight attachment. Once the child seating apparatus 10 is secured, the parent may place the child into the seat 12. Additional features for securing the child seating apparatus to a table are described below with respect to FIGS. 15-18.

Another embodiment of a child seating apparatus 110 in accordance with the present invention is shown in FIGS. 9-14, wherein similar components are numbered similarly to like components shown in FIGS. 1-8. The child seating apparatus 110 includes a seat 112, a support structure 116, and a body 118. The body 118 is removably attached to the support structure 116. Preferably, the body 118 is snap-fitted to the support structure and easily removed for cleaning. The seat 112 is fastened to the support structure 116 by way of grommets 124a and tangs 124b. As noted above, other fastening means may be used to attach the seat 112 to the support structure 116, including snaps, hooks, clips, straps, Velcro® fasteners or the like.

The child seating apparatus 110 includes a mounting mechanism 114 much like the mechanism 14 discussed previously, and including all the same features and capabilities for attaching the child seating apparatus 110 to a shopping cart, a table or similar frame structure in a simple but secure fashion. The support structure 116 also includes a strap adjustment mechanism 140 for receiving straps 138 that adjustably tether hooks 32 or similar connectors to the support structure 116. As shown in FIG. 10, the strap adjustment mechanism 140 includes a toggle 142 corresponding to each strap 138 for tightening and loosening the straps. Alternatively, the strap adjustment mechanism 140 can include any device that permits tightening and loosening of straps.

As shown in FIG. 10, the support structure 116 includes handlebar extensions 150. When the child seating apparatus 110 is mounted on a shopping cart in the manner shown in FIG. 11, a parent can maneuver the shopping cart by grasping the handlebar extensions 150 as opposed to trying to reach the shopping cart handlebar and risk dislodging the child seating apparatus 110.

In use, the child seating apparatus 110 can be mounted to the handlebar 28 of the shopping cart 30 in much the same way as discussed above with respect to child seating apparatus 10. The parent slides the mounting mechanism 114 over the handlebar 28 and secures the child seating apparatus 110 against rotation around the handlebar 28 by engaging the hooks 132 with the shopping cart frame. The straps 138 can be adjusted as desired by releasing the toggles 142 and pulling the straps 138 tight. When a desirable strap setting has been obtained, that is, when second child seat attachment 110 does not wobble around the handlebar 28, the parent fixes the straps 138 in the desired position by securing the toggles 142 of the strap adjustment mechanism 140. The parent can use the handlebar extensions 150 for pushing the cart 30. When the second child seat attachment 110 is removed from the shopping cart 30, the parent can carry the second child seat attachment 110 using a handle 154 formed in the body portion 118 of the child seating apparatus 110.

Figure 12:
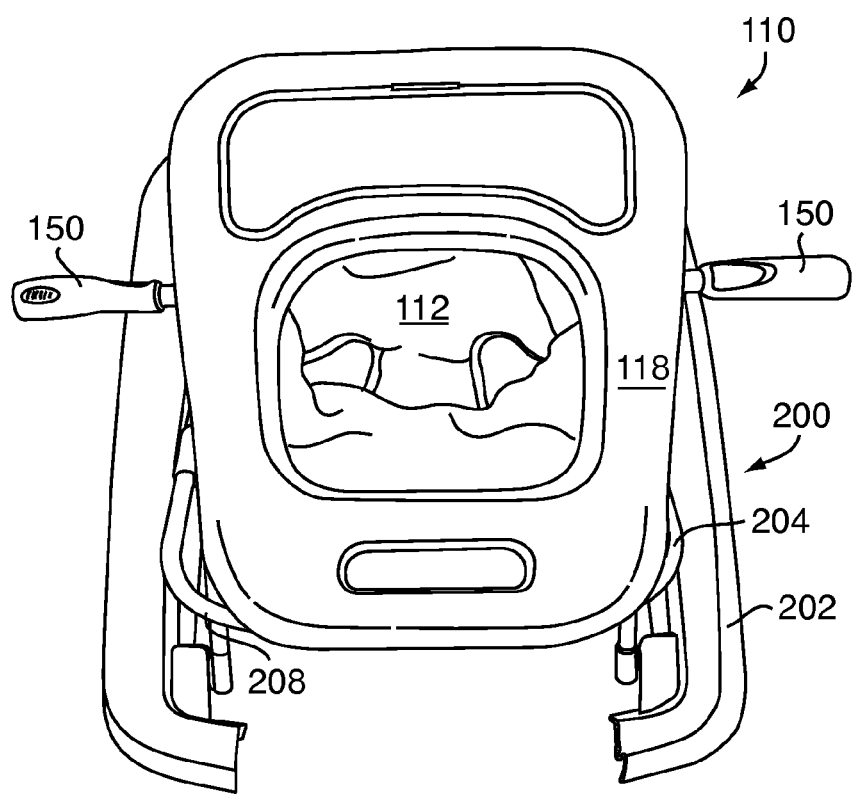
FIG. 12 is a top view of the multi-use child seating apparatus of FIG. 9 mounted to a walker unit.
Figure 13:
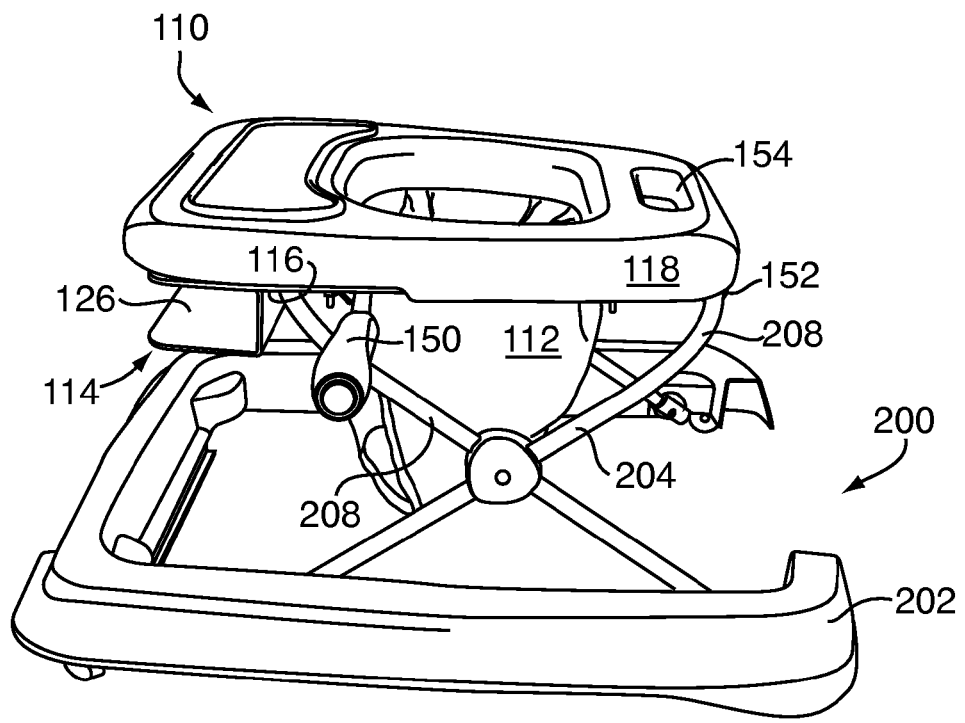
FIG. 13 is a side view of the multi-use child seating apparatus and walker unit combination of FIG. 12.
Figure 14:
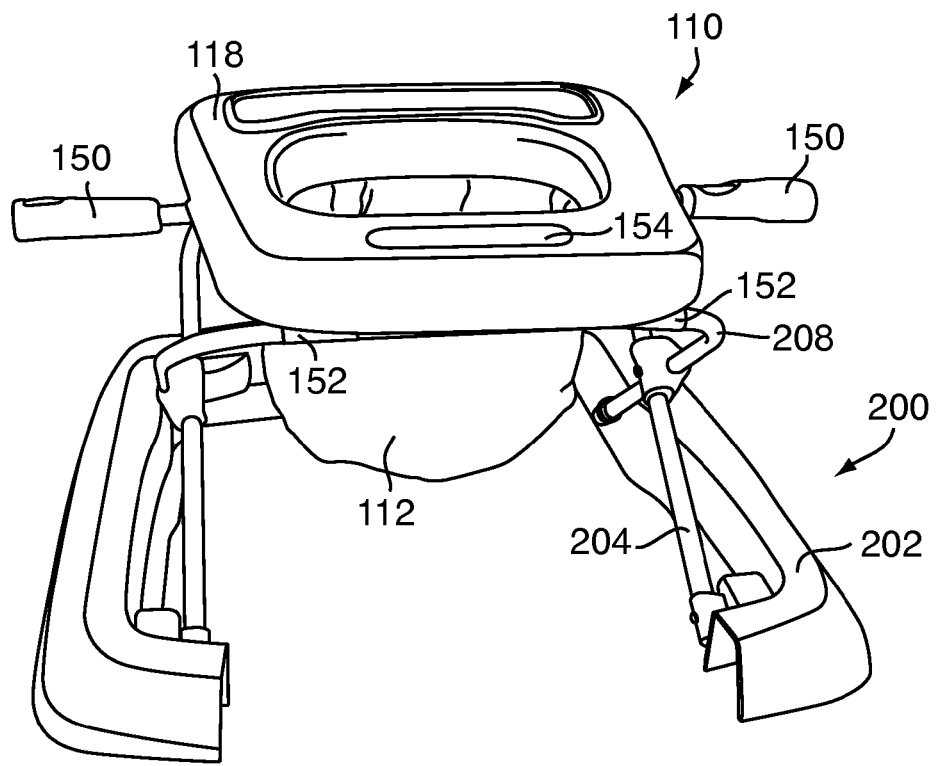
FIG. 14 is a rear view of the multi-use child seating apparatus and walker unit combination of FIG. 12.

Referring to FIGS. 12-14, another mode of use for the child seating apparatus 110 is shown. Specifically, the child seating apparatus 110 can be mounted to a walker unit 200 or similar child activity center. The walker unit 200 includes a rolling base 202 and a frame 204. Preferably, the rolling base 202 is U-shaped to permit a child to hold onto and push the walker 200 while standing behind the walker unit 200. Thus, the walker unit 200 provides a walker device for helping a child learn to walk either in an upright seated position or a standing position. To aid a child standing behind the walker device, the child can grasp the carrying handle 154 formed in the body portion 118 of the child seating apparatus 110.

Preferably, the walker frame 204 is adjustable, with or without the child seating apparatus 110, to a plurality of secured heights between a fully collapsed position and a fully raised position. The plurality of secured heights permit adjustment of the walker frame 204 to match the leg length of a child seated in the seat 112 with the child seating apparatus 110 installed on the walker unit 200. When the walker frame 204 is adjusted to the fully collapsed position, the walker unit 200 is easily portable, such as for travel. The child seating apparatus 110 is mountable to the walker unit 200 regardless of the height setting of the walker frame 204. Thus, the child seating apparatus 110 can be mounted to the walker unit 200 at the fully raised position and the fully collapsed position, and at any setting in between. Moreover, the child seating apparatus 110 is preferably capable of being disengaged from the walker unit 200 at any of the adjusted height settings. Most helpful is the ability to remove the child seating apparatus 110 from a fully collapsed walker frame 204 without needing to open the walker frame 204 to a raised position. Thus, a parent can collapse the child seating apparatus/walker unit combination and place it in the car for a trip. Should the parent need to stop at a grocery store, the parent can disengage the child seating apparatus 110 from the walker unit 200 in the trunk of the car without removing and/or setting up the walker unit 200 so as to mount the child seating apparatus 110 onto a shopping cart in the manner discussed herein. When the parent is done shopping, the parent can easily reattach the child seating apparatus 110 to the walker unit 200.

There are multiple approaches for securing the child seating apparatus 110 to the walker unit 200. For example, the child seating apparatus 110 can be fastened to the walker frame 204 using clips 152 or similar attachment means attached to the undersurface 116a of the support structure 116. In one mode of fastening, the clips 152 are elastically deformed to receive and snap fit around one of the crossbars 208 of the walker frame 204. The channel 126 can be installed over another of the crossbars 208, can rest against an outward surface of the other of the crossbars 208, or can include it own clips on an outer surface thereof that clip onto a cross bar of the walker frame 204. Straps, ties, latches, Velcro®, clasps, or similar known fasteners can also be used to attached the child seating apparatus 110 to one or more crossbars 208 of the walker frame 204.

Figure 15:
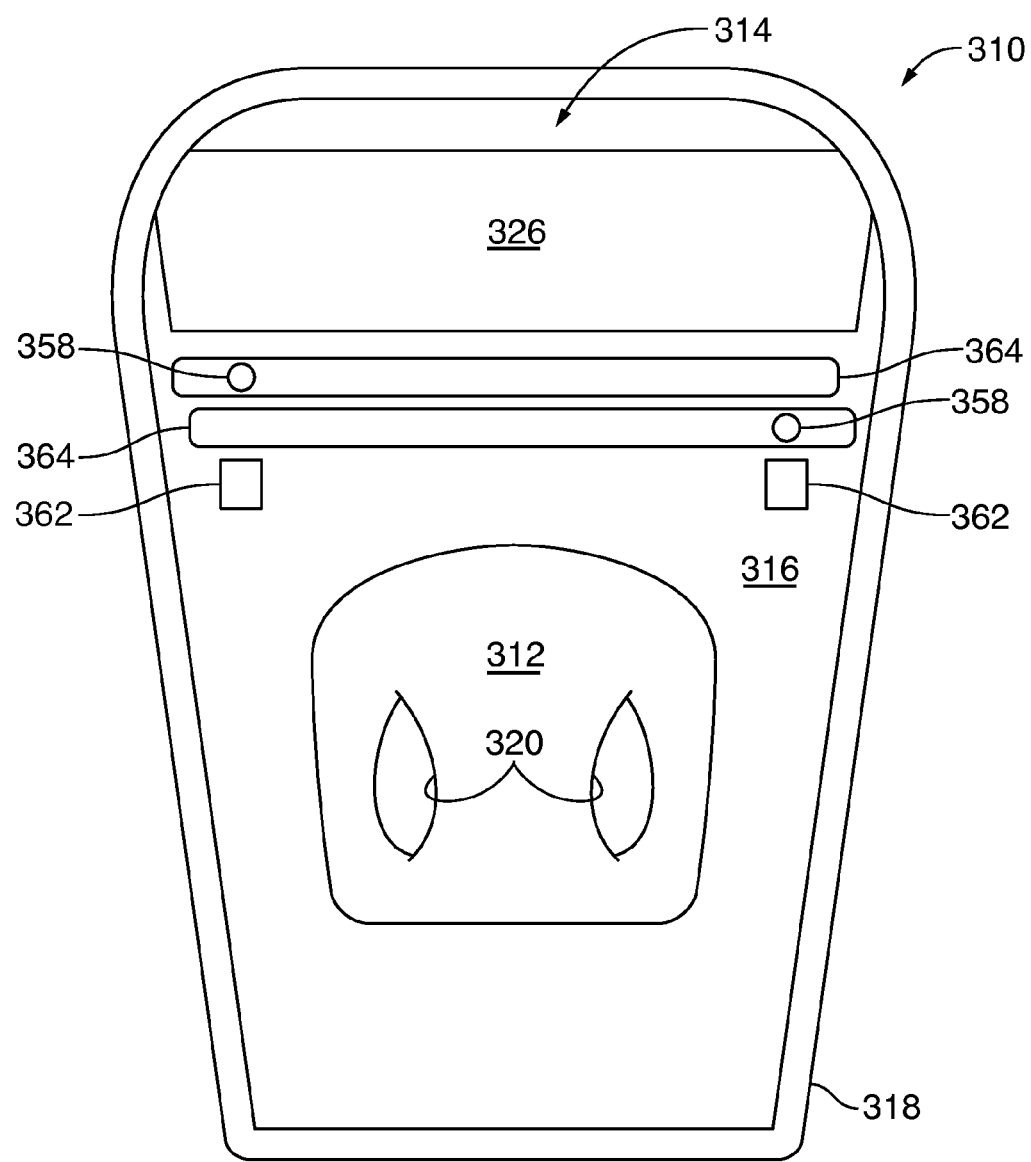
Figure 16A:
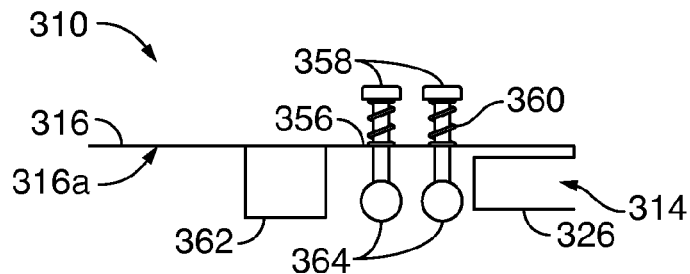
FIG. 16 is a sequence of diagrammatic views of the multi-use child seating apparatus of FIG. 15, being mounted to a table.
Figure 16B:
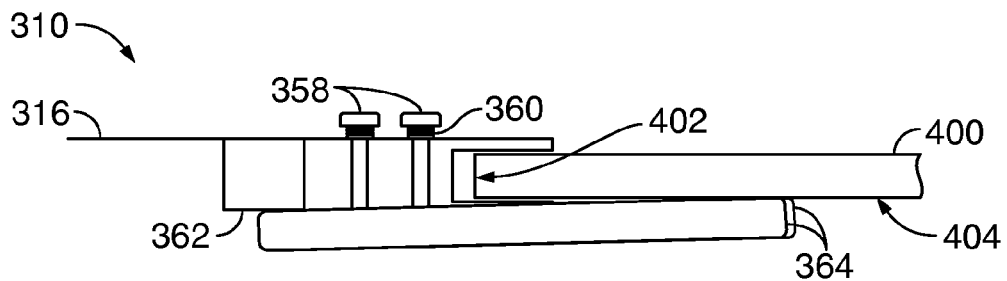

Referring to FIGS. 15 and 16, another embodiment of a child seating apparatus 310 in accordance with the present invention is shown. Similar components of the child seating apparatus 310 are numbered similarly to like components shown in FIGS. 1-14. The child seating apparatus 310 includes a seat 312, a support structure 316, and a body 318. The support structure 316 includes pivot pinholes 356 in which pivot pins 358 are supported by pin springs 360. The support structure 316 also includes leverage points 362 formed on its undersurface 316a. Pivoting legs 364 are mounted on the pivot pins 358 below the support structure 316. The child seating apparatus 310 can be mounted to a shopping cart in the manner discussed above. Additionally, the child seating apparatus can be mounted to a walker unit in the manner discussed with respect to FIGS. 12-14. For mounting the child seating apparatus 310 on a table 400, as shown in FIG. 16, the channel 326 is engaged over an edge 402 of the table 400 and the pivoting legs 364 are moved from a stored position "A", disposed crosswise under the support structure 316 rearward of the mounting mechanism 314, to a deployed position "B", extending forward from the support structure 316 below the mounting mechanism 314 to engage an undersurface 404 of the table 400. In the deployed position "B", rearward ends of the pivoting legs 364 are forced downward by the leverage points 362, thereby enhancing engagement of the legs with the table undersurface 404. The legs 364 may further be telescoped and adjusted so as to accommodate varying table dimensions without compromising safety of the child seating apparatus 310 as attached to the table 400.

Figure 17:
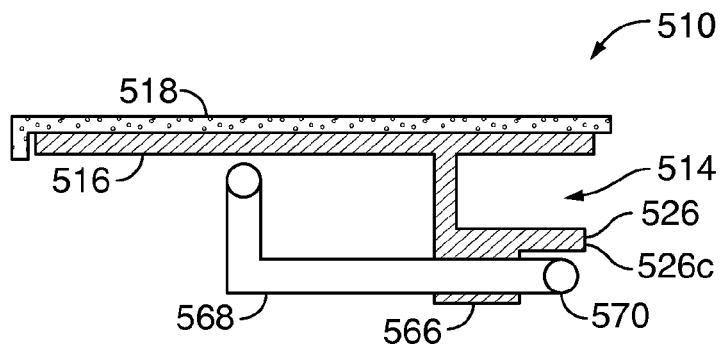
Figure 18:
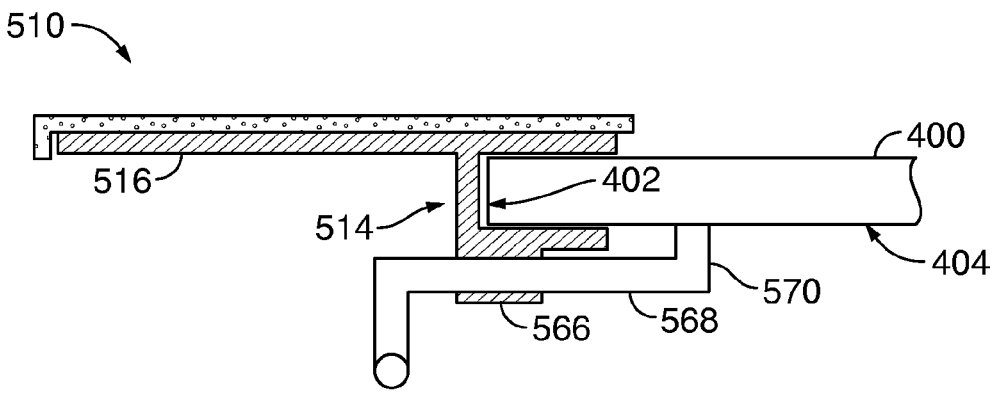
FIG. 18 is a sectional side view of the multi-use child seating apparatus of FIG. 17, mounted to a table.

Referring to FIGS. 17 and 18, another embodiment of a child seating apparatus 510 in accordance with the present invention is shown. Similar components of the child seating apparatus 510 are numbered similarly to like components shown in FIGS. 1-16. The child seating apparatus 510 includes a seat 512, a support structure 516, and a body 518. A mounting mechanism 514 attached to the undersurface of the support structure 516 includes sleeves 566 attached to a lower portion 562c of a generally U-shaped channel 526. The sleeves 566 have extensible legs 568 slidably mounted therein. The extensible legs 568 include feet 570 protruding substantially perpendicularly from a forward end thereof. The extensible legs 568 are movable within the sleeves 566 from a rearward stored position, as shown in FIG. 17, to a forward extended position, as shown in FIG. 18. For mounting the child seating apparatus 510 on the table 400, the channel 526 is engaged over the table edge 402 and the extensible legs 568 are moved to the forward extended position so that the feet 570 press against the undersurface 404 of the table 400. To disengage the child seating apparatus 510 from the table, the legs 568 may be retracted within the sleeves 566 to stored position. The legs 568 may further include a telescoping portion to increase the length of the legs 568 to accommodate varying table dimensions without compromising safety of the child seating apparatus 510 as attached to the table 400.

Alternatively, the pivoting legs 364 can be pivotally mounted directly to the underside of the U-shaped channel of the mounting mechanism 314. When the legs 364 are in the stored position, they can be generally parallelly positioned with respect to the channel and one another and locked into position by snap knuckles or clips. To move the legs 364 to the deployed position, they can be disengaged from the snap knuckles or clips and pivoted out into position where distal ends of each leg project away from the mounting mechanism 314 to engage the table undersurface 404. More particularly, the pivot ends of the legs 364 can be connected to respective ends of the channel, and when the legs 364 are moved to the deployed position, one leg 364 is pivoted in a clockwise direction and the other leg 364 is pivoted in a counter clockwise direction. Additional snap knuckles or clips can be positioned on the mounted mechanism 314 to snap or lock the legs 364 in their respective deployed positions.

In the embodiments illustrated in FIGS. 15-18, the legs 364 and 568 do not interfere with the mounting of the child seating apparatus 310 or 510 to a walker unit 200 (as shown in FIGS. 12-14) or on a shopping cart (as shown in FIGS. 1-11). Alternatively, the pivotable legs 364 or the extensible legs 568 may be positioned in a retracted position to act as handlebar extensions to aid a parent using the child seating apparatus as mounted on a shopping cart.

The present invention offers many advantages over existing devices that are used to carry small children during shopping trips. The primary advantage to the present invention is its lightweight, inexpensive properties. For example, the preferred embodiment of the present invention is manufactured primarily from plastic, fabric, and certain metal components, all of which are inexpensive and lightweight. Moreover, construction of the present invention is simple and may be achieved by hand or simple molding and machining processes.

Other advantages include the parent-friendly and child-friendly aspects of the present invention. Any of the child seat attachments 10, 110, 310 and 510 is lightweight and small in size, easy to carry, and may be stored in a parent's car so it will be readily available for all shopping excursions or other trips. Alternatively, the attachment can be made available at a store, either fixed to a shopping cart, or available for the parent to attach to an available cart. Additionally, the seat is comfortable to the child being carried in the child seat attachment. For example, in one embodiment of the present invention, the seat is manufactured of soft fabric having padding. In additional embodiments, the seat may include a headrest, arm rests, foot rests, or other padded supports, all enhancing the comfort of the child and, with respect to young infants, providing neck support. The child's comfort will allow the parent to spend more time shopping without the child getting restless.

Further advantages to the present invention include convenience features for the parent. For example, any of the child seat attachments 10, 110, 310 and 510 may include cup holders, bottle holders, toy organizers, grip handles for the child, additional trays, or pockets for storage of the child's toys and/or the parent's personal items. These convenient features may be disposed on any available surface of the support structure. Each of these convenience features enhances the user-friendly properties of the present invention.

While the present invention has been described with reference to certain embodiments thereof, it will be understood by those skilled in the art that various other changes may be made, and equivalents may be substituted for elements thereof, without departing from the essential scope of the present invention. Additionally, it is intended that various features described herein can be combined even though shown and described separately from one another in the embodiments depicted in the Figures. Such features may therefore be incorporated into any of the other embodiments without departing from the scope of the invention. Thus, the present invention is generally directed to a child seating apparatus that has multi-use capability, including use with a walker unit, for attachment on a shopping cart, and for attachment to a table. Therefore, it is intended that the invention include all equivalent embodiments.

The foregoing description of embodiments of the invention has been presented for the purpose of illustration and description. It is not intended to be exhaustive or to limit the invention to the form disclosed. The embodiments described were chosen to best illustrate the principles of the invention and practical applications thereof to enable one of ordinary skill in the art to utilize the invention in various embodiments and with various modification as suited to particular uses contemplated. It is intended that the scope of the invention be defined by the claims appended hereto.

What is claimed is:

1. A multi-use child seating apparatus adapted for attachment to a frame structure including at least one of a shopping cart, a table, a walker unit, and a mobile child activity center, the child seating apparatus comprising:
   a seating unit including a seating frame and a flexible seat for receiving a child in a seated position therein, said flexible seat being removably attached to the seating frame;
   a mounting mechanism attached to the seating frame and adapted for mounting the child seating apparatus to the frame structure;
   at least one connector anchored to one of the seating frame and the mounting mechanism, and adapted for engagement with the frame structure for securing the seating apparatus to the frame structure and for bracing the child seating apparatus from movement when a child is seated in the flexible seat;
   a plurality of legs being movably connected to the seating frame, each leg being movable between a stored position and a deployed position; and
   wherein a portion of each of said legs is positioned away from the seating frame when the legs are in the deployed position, said leg portions engaging the frame structure to support attachment of the child seating apparatus to the frame structure.

2. The multi-use child seating apparatus of claim 1 wherein the mounting mechanism comprises a U-shaped channel adapted to receive a portion of the frame structure within said channel.

3. The multi-use child seating apparatus of claim 1 further comprising:
   sleeves rigidly connected to the mounting mechanism;
   wherein said legs are slidably extensible and retractable within and along the sleeves between the stored position and the deployed position.

4. The multi-use child seating apparatus of claim 1 wherein said legs are pivotally connected to the seating frame and pivotable between the stored position, wherein each of the legs are disposed under the seating frame, and the deployed position, wherein each of the legs project away from the seating frame to engage the frame structure.

5. The multi-use child seating apparatus of claim 1 wherein the seating frame comprises a support structure and a body portion, and said body portion and said flexible seat are removably attached to the support structure.

6. The multi-use child seating apparatus of claim 1 wherein said at least one connector comprises a fastener attached to an adjustable strap, said fastener being capable of engaging the frame structure.

7. The multi-use child seating apparatus of claim 2 wherein the U-shaped channel includes gripping means disposed on the interior surface thereof for engaging a portion of the frame structure to secure the attachment of the child seating apparatus to the frame structure.

8. The multi-use child seating apparatus of claim 5, wherein the support structure comprises aluminum and the body portion comprises an injection molded plastic.

9. A combined walker and multi-use child seating apparatus, comprising:
   a walker unit comprising a U-shaped base and a frame;
   a seating unit removably mounted to the walker unit, said seating unit comprising:
      a seating frame;
      a flexible seat for receiving a child in a seated position therein, said flexible seat being removably attached to the seating frame;
      at least one fastener for attaching the seating unit to the walker frame;
   wherein a child is supported in an upright seated position when placed within the flexible seat;
   wherein the child may operate the walker unit by holding onto the seating unit when standing behind the combined walker and multi-use child seating apparatus;
   wherein:
      the seating unit further comprises a mounting mechanism including a U-shaped channel attached to the seating frame, said mounting mechanism being adapted to mount the seating unit to a frame structure when the seating unit is removed from the walker unit;
      the seating frame is removable from the walker unit for attachment to a frame structure comprising one of a shopping cart and a table; and
      the mounting mechanism of the seating unit is adapted for receiving a portion of the frame structure for mounting the seating unit to the frame structure.

10. The combined walker and multi-use child seating apparatus of claim 9 wherein the mounting mechanism engages the walker frame to mount the seating unit to the walker unit.

11. The combined walker and multi-use child seating apparatus of claim 9 wherein the walker frame is adjustable to a plurality of selected height positions between a fully raised position and a fully collapsed position.

12. The combined walker and multi-use child seating apparatus of claim 9 wherein the seating unit further comprises:
   at least one connector anchored to one of the seating frame and the mounting mechanism, and adapted for engagement with the frame structure for securing the seating unit to the frame structure and for bracing the seating unit from movement when a child is seated in the flexible seat.

13. The combined walker and multi-use child seating apparatus of claim 9 wherein the seating unit further comprises:
   a plurality of legs being movably connected to the seating frame, each leg being movable between a stored position and a deployed position;
   wherein a portion of each of said legs is positioned away from the seating frame when the legs are in the deployed position, said leg portions engaging the frame structure to support attachment of the seating unit to the frame structure.

14. The combined walker and multi-use child seating apparatus of claim 10 wherein said at least one fastener is attached to the underside of a first end of the seating frame for attachment to a corresponding first end of the walker frame and the mounting mechanism is positioned on the underside of an opposing second end of the seating frame for engagement with a corresponding second end of the walker frame.

15. The combined walker and multi-use child seating apparatus of claim 14 wherein the U-shaped channel of the mounting mechanism receives a portion of the second end of the walker frame therein.

16. The combined walker and multi-use child seating apparatus of claim 12 wherein the U-shaped channel includes gripping means disposed on the interior surface thereof for engaging a portion of the frame structure to secure the attachment of the seating unit to the frame structure.

* * * * *